T. M. KING.
Harrows.

No. 139,065.  Patented May 20, 1873

Witnesses,  Inventor.

UNITED STATES PATENT OFFICE.

THOMAS M. KING, OF MURFREESBOROUGH, TENNESSEE.

IMPROVEMENT IN HARROWS.

Specification forming part of Letters Patent No. 139,065, dated May 20, 1873; application filed January 6, 1873.

*To all whom it may concern:*

Figure 1:
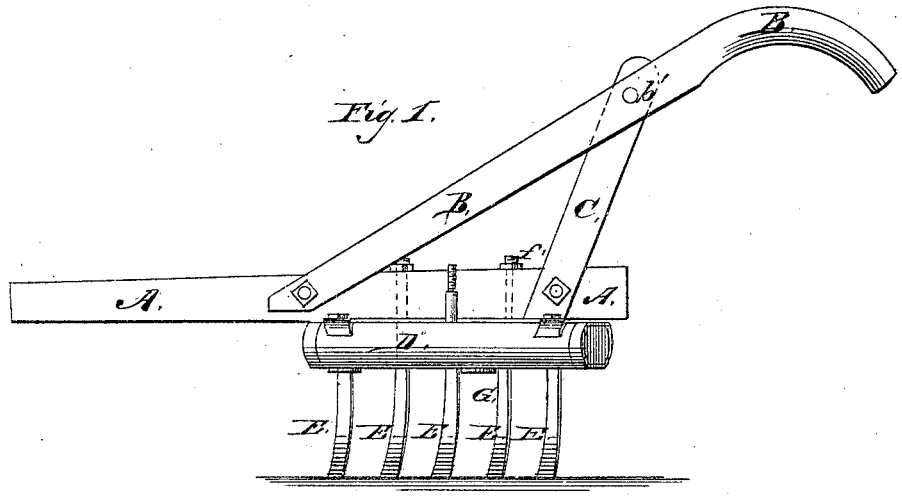
Figure 2:
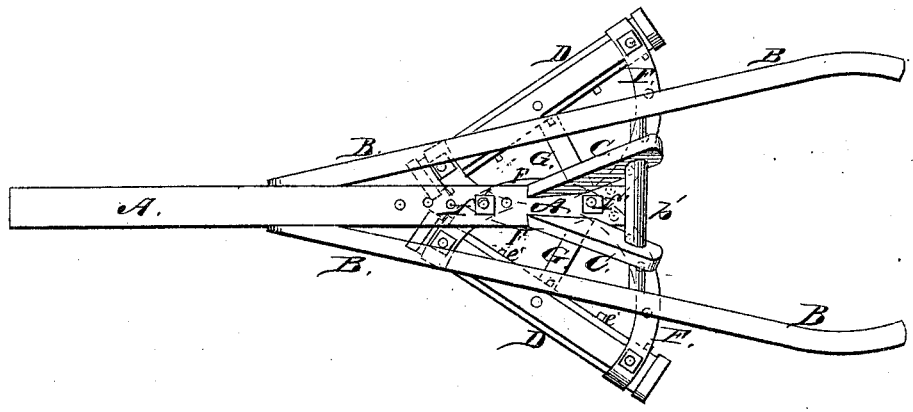

Be it known that I, THOMAS M. KING, of Murfreesborough, in the county of Rutherford and State of Tennessee, have invented a new and useful Improvement in Harrows, of which the following is a specification:

Figure 1 is side view, and Fig. 2 a plan view of the harrow.

It consists of two harrows, the frame of each being formed of a straight bar and a semicircular bar, and attached to a beam by bolts, so as to be adjustable at various angles to each other, as hereinafter described.

A is the plow-beam, B B are the handles, C C uprights, and $b\,a$ round connecting handles and uprights. Each harrow-frame is formed of a straight bar, D, and semicircular bar F, their respective ends joining. G G are braces connecting the bars D and F. A number of teeth (not shown) are attached to the bars D by screw-thread and nut, or in any other suitable manner. The harrows are attached to the beam A by two screw-bolts $f''$ passing through holes formed in the same and through holes in the bars F.

The two independent parts, D F, may be adjusted to leave a wide or narrow space between the adjacent ends of the bars D, to adapt the harrow to be used for pulverizing or cultivating the earth on each side of rows of plants of various kinds or forms of growth.

Having thus described my invention, I claim as new and desire to secure by Letters Patent—

The improved harrow, consisting of the two like parts, each formed of a straight bar, D, perforated semicircular bar F, central brace-bar G, and teeth E, attached to the beam A by two adjusting bolts $f'$, as shown and described, whereby they may be set at various angles to each other horizontally and adjusted so as to leave a wide or narrow space between them at their front ends, as specified.

THOMAS M. KING.

Witnesses:
WM. T. HENDERSON,
JAMES CLAYTON.